United States Patent
McCarthy, Jr. et al.

(10) Patent No.: US 12,553,399 B2
(45) Date of Patent: Feb. 17, 2026

(54) TORSIONAL VIBRATION SOLUTIONS FOR CYLINDER DEACTIVATION

(71) Applicant: Eaton Intelligent Power Limited, Dublin (IE)

(72) Inventors: James E. McCarthy, Jr., Kalamazoo, MI (US); Barry T. Adams, Leo, IN (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/841,488

(22) PCT Filed: Feb. 28, 2023

(86) PCT No.: PCT/EP2023/025090
§ 371 (c)(1),
(2) Date: Aug. 26, 2024

(87) PCT Pub. No.: WO2023/160880
PCT Pub. Date: Aug. 31, 2023

(65) Prior Publication Data
US 2025/0075670 A1    Mar. 6, 2025

Related U.S. Application Data

(60) Provisional application No. 63/268,636, filed on Feb. 28, 2022.

(51) Int. Cl.
*F02D 41/14* (2006.01)
*F02B 75/18* (2006.01)

(52) U.S. Cl.
CPC .......... *F02D 41/1498* (2013.01); *F02B 75/18* (2013.01); *F02B 2075/1824* (2013.01); *F02D 2200/101* (2013.01); *F02D 2200/50* (2013.01)

(58) Field of Classification Search
CPC .............. F02B 2075/1824; F02B 75/18; F02D 41/1498
See application file for complete search history.

(56) References Cited

U.S. PATENT DOCUMENTS

2019/0376459 A1* 12/2019 Pieczko .................. F02D 13/06

FOREIGN PATENT DOCUMENTS

| WO | 2018235023 | 12/2018 |
| WO | 2021035215 | 2/2021 |

OTHER PUBLICATIONS

Gosala Dheeraj, et al. "Model-based design of dynamic firing patters for supervisory control of diesel engine vibration", Control Engineering Practice, Pergamon Press, Oxford, GB, vol. 107, Nov. 28, 2020. 18 pages.

(Continued)

*Primary Examiner* — Kevin A Lathers
(74) *Attorney, Agent, or Firm* — Meunier Carlin & Curfman LLC

(57) ABSTRACT

A method for operating a 6-cylinder engine connected to a driveline including a transmission. The method includes: monitoring a rotational speed of a crankshaft of the 6-cylinder engine: monitoring a gear selection of the transmission; and operating the 6-cylinder engine in one of Order 3, Order 1.5 or Order 1 based on whether the selected Order avoids operating the 6-cylinder engine at a critical speed that corresponds to a natural harmonic frequency of the driveline, wherein priority is given to operating in Order 1.5, Order 1 then Order 3, in that order.

20 Claims, 8 Drawing Sheets

(56) References Cited

OTHER PUBLICATIONS

International Search Report and Written Opinion for PCT/EP2023/025090, dated Jun. 28, 2023, 11 pages.

* cited by examiner

TORSIONAL VIBRATION SOLUTIONS FOR CYLINDER DEACTIVATION

PRIORITY

This application claims benefit of priority of U.S. provisional patent application Ser. No. 63/268,636, filed Feb. 28, 2022, which is incorporated herein in its entirety.

FIELD

This application provides systems and method for implementing cylinder deactivation modes in engine systems.

BACKGROUND

Cylinder deactivation ("CDA"), where intake and exhaust valves are closed and fuel is shut off while a piston reciprocates in an engine cylinder, has been understood to provide benefits, such as but not limited to, increased fuel economy. Challenges exist to implement CDA modes in light of the noise, vibration, and harshness ("NVH") the vehicle experiences.

SUMMARY

There is provided a method of operating a 6-cylinder engine connected to a driveline. The method includes: monitoring a rotational speed of a crankshaft of the 6-cylinder engine; monitoring a gear selection of a transmission of the driveline; and when the transmission is in gears 1 through 5, selectively operating the 6-cylinder engine in Order 1.5 when the speed of crankshaft is less than 1160 RPM and operating the 6-cylinder engine in Order 1 when the speed of crankshaft is less than 1720 RPM.

There is also provided a method of operating a 6-cylinder engine connected to a driveline. The method includes monitoring a rotational speed of a crankshaft of the 6-cylinder engine; monitoring a gear selection of a transmission of the driveline; and operating the 6-cylinder engine in Order 1 when the transmission is in gears 1 through 9 and the speed of crankshaft is less than 1480 RPM.

There is also provided a method of operating a 6-cylinder engine connected to a driveline. The method includes: monitoring a rotational speed of a crankshaft of the 6-cylinder engine; monitoring a gear selection of a transmission of the driveline; and operating the 6-cylinder engine in Order 1 when the transmission is in gears 1 through 8 and the speed of crankshaft is less than 1660 RPM.

There is also provided a method of operating a 6-cylinder engine connected to a driveline. The method includes: monitoring a rotational speed of a crankshaft of the 6-cylinder engine; monitoring a gear selection of a transmission of the driveline; and operating the 6-cylinder engine in Order 1.5 when the transmission is in gears 1 through 7 and the speed of crankshaft is less than 1040 RPM.

There is also provided a method of operating a 6-cylinder engine connected to a driveline. The method includes: monitoring a rotational speed of a crankshaft of the 6-cylinder engine; monitoring a gear selection of a transmission of the driveline; and operating the 6-cylinder engine in Order 1.5 when the transmission is in gears 1 through 5 and the speed of crankshaft is less than 1160 RPM.

There is provided a method of operating a 6-cylinder engine connected to a driveline. The method includes: monitoring a rotational speed of a crankshaft of the 6-cylinder engine; monitoring a gear selection of a transmission of the driveline; and operating the 6-cylinder engine in Order 1.5 when the transmission is in gears 1 through 9 and the speed of crankshaft is less than 920 RPM.

There is provided a method for operating a 6-cylinder engine connected to a driveline. The method includes: monitoring a rotational speed of a crankshaft of the 6-cylinder engine; monitoring a gear of the transmission; and selectively operating the 6-cylinder engine in one of Order 3, Order 1.5 or Order 1 based on the following criteria in the following order: first, operating the 6-cylinder engine in Order 1.5 if the rotational speed of the crankshaft is not within a predetermined differential speed of a critical speed of the crankshaft for the engine in Order 1.5 for the gear of the transmission, wherein the critical speed causes the driveline to vibrate at a natural harmonic frequency of the driveline, second, operating the 6-cylinder engine in Order 1 if the rotational speed of the crankshaft is not within a predetermined differential speed of a critical speed of the crankshaft for the engine in Order 1 for the gear of the transmission, wherein the critical speed causes the driveline to vibrate at a natural harmonic frequency of the driveline, else, operating the 6-cylinder engine in Order 3.

In the foregoing method, operating in Order 1 prioritizes firing 2 cylinders over firing 4 cylinders.

In the foregoing method, the predetermined differential speed is 200 revolutions per minute.

In the foregoing method, the predetermined differential speed is 150 revolutions per minute.

In the foregoing method, the transmission has 12 gears.

In the foregoing method, the transmission has 18 gears.

In the foregoing method, the transmission is provided on a vehicle with a 6×2 configuration.

In the foregoing method, the transmission is provided on a vehicle with a 6×4 configuration.

In the foregoing method, the transmission is provided on a vehicle with a 8×6 configuration.

In the foregoing method, the natural harmonic frequency of the driveline corresponds to a torsional vibration of the driveline.

There is also provided a method for operating a 6-cylinder engine connected to a driveline including a transmission. The method includes monitoring a rotational speed of a crankshaft of the 6-cylinder engine; monitoring a gear selection of the transmission; and operating the 6-cylinder engine in one of Order 3, Order 1.5 or Order 1 based on whether the selected Order avoids operating the 6-cylinder engine at a critical speed that corresponds to a natural harmonic frequency of the driveline, wherein priority is given to operating in Order 1.5, Order 1 then Order 3, in that order.

In the foregoing method, operating in Order 1 prioritizes firing 2 cylinders over firing 4 cylinders.

In the foregoing method, the transmission has 12 gears.

In the foregoing method, the transmission has 18 gears.

In the foregoing method, the transmission is provided on a vehicle with a 6×2 configuration.

In the foregoing method, the transmission is provided on a vehicle with a 6×4 configuration.

In the foregoing method, the transmission is provided on a vehicle with a 8×6 configuration.

In the foregoing method, the natural harmonic frequency of the driveline corresponds to a torsional vibration of the driveline.

DETAILED DESCRIPTION

Figure 1:
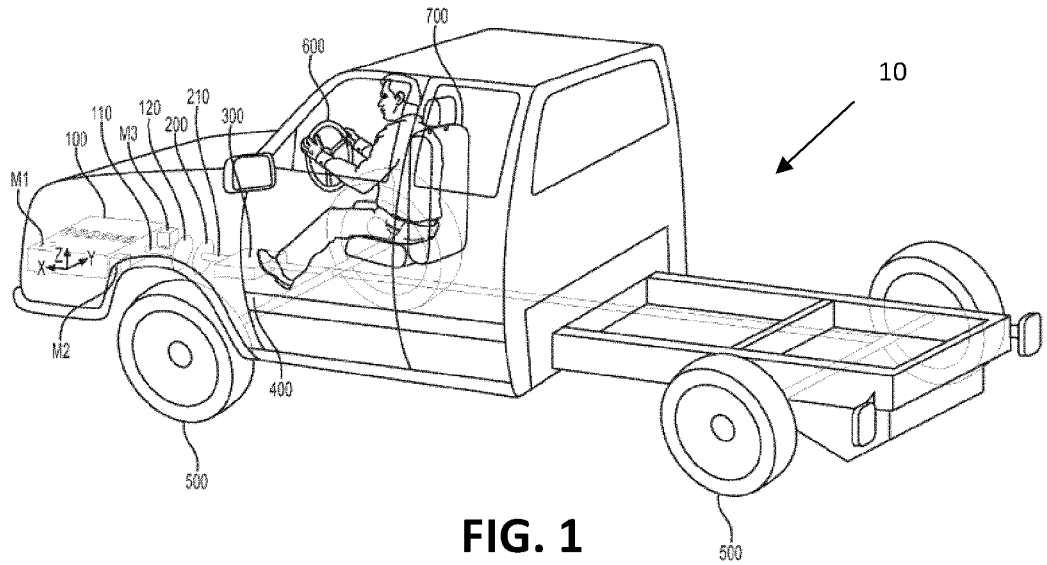
FIG. 1 is a schematic illustrating aspects of a vehicle NVH transmission pathway.

FIG. 1 shows a simplified illustration of a vehicle 10. The vehicle 10 includes an engine 100 outputting power via a crankshaft 110 to a flywheel 120. The clutch 200 is shown open and connected to the input shaft of the transmission 300. Drive axles and a driveshaft 400 are shown connected to wheels 500. The clutch 200, transmission 300, drive axles and driveshaft 400 are referred to as the driveline. A driver seat 700 experiences noise, vibration, and harshness (NVH) from many aspects of the vehicle 10. Many aspects of the vehicle 10 are omitted to simplify the drawings, but such aspects can be included and are not limited to differentials, power take-off (PTO), brake system, supercharger, cooling systems, battery systems, among many other aspects. The powertrain comprises the minimum components of FIG. 1 to convey motive power from the engine 100 (power source) to the wheels 500. The clutch 200 is shown disconnected from the flywheel 200 (clutch 200 is "open"). The components downstream from the flywheel 200 can collectively be referred to as the drivetrain. The drivetrain resonance can be collectively summed and the natural frequency of the drivetrain can be measured at the coupling between the flywheel 200 and the downstream devices of the drivetrain. Realizing that the drivetrain natural frequency can be summed in this way has not been obvious to others in the art for purposes of determining the cylinder deactivation (CDA) mode of engine operation.

The vehicle 10 can experience NVH as a result of two primary sources, linear vibration and torsional vibration of the engine 100. The linear vibration of the engine 100 may be measured in an x, y and z direction at the engine mounts M1, M2, M3. Conversely, the torsional vibration of the engine 100 is an angular measurement that may be measured at engine couplings (not shown) or the driveshaft 400.

Figure 2:
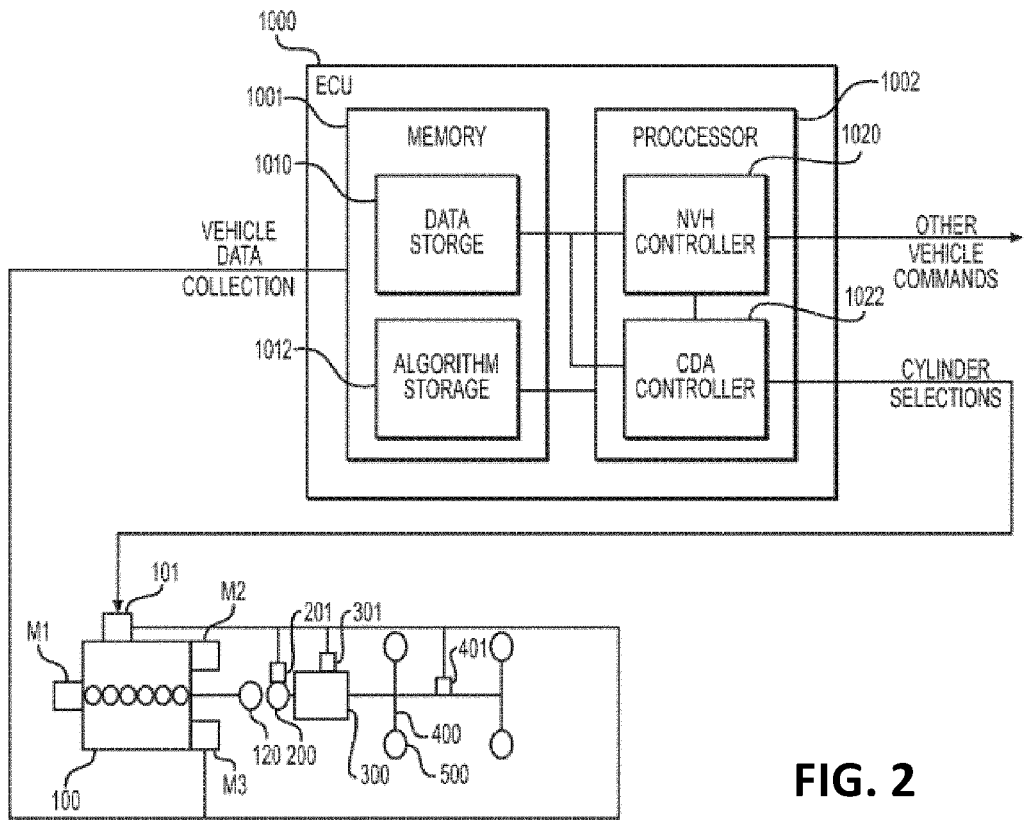
FIG. 2 is a schematic of control electronics.

Turning to FIG. 2, a schematic of control electronics is shown. Engine mounts, namely front engine mount M1 and left and right rear engine mounts M2, M3, can be placed in locations to stabilize the roll and pitch of the engine. Sensors, such as accelerometers, can be integrated with the engine mounts M1, M2, M3 to monitor the roll and pitch of the engine and can monitor engine mount behavior. One or more engine sensor 101 can monitor engine activity such as valvetrain activity, fueling, piston motion, crankshaft RPMs, among other data. A clutch sensor 201 can monitor the open, close, or slip positions of the clutch 200. One or more transmission sensor 301 can monitor the gear selection, neutral position, operating conditions, among other aspects of transmission operation. One or more drivetrain sensor 401 can monitor the axles, wheels, brakes, and other chassis activity, for example.

Each of the sensors 101, 201, 301, 401 can feed vehicle data collected from the vehicle 10 to one or more on-board or networked computing devices. An electronic control unit ("ECU") 1000 in this example is on-board, though it can be networked with so called cloud computing, including GPS or other location services, fleet management applications, among others. Each of the sensors can be bi-directional and receive commands from the ECU 1000 and so the sensors 101, 201, 301, 401 can also comprise an affiliated or integrated actuator.

Example actuations can comprise adjusting the engine mounts M1, M2, M3, directing valvetrain or fuel injection, implementing fail-safes, opening or closing the clutch, changing transmission gear or selecting a neutral position, opening or closing a differential, PTO, brake caliper, wheel hub, among others. Numerous manifestations of valvetrains can be used with the disclosure, and the engine sensor 101 is representative of the myriad combination of control devices that can be actuated to implement combustion, fueling, and cylinder deactivation, among other techniques such as engine braking, early or late valve opening or closing strategies, among others.

The collected vehicle data can be stored in a memory device 1001, which can comprise a data storage section 1010 and an algorithm storage section 1012, for example. A processor-executable control algorithm stored in a memory device can be configured for operating an engine in a cylinder deactivation (CDA) mode comprising any of the methods disclosed herein.

One or more processing devices can be included to process the stored data and the stored algorithms. Processor 1002 comprises in the example an NVH controller 1020 that can process data and output other vehicle commands to the actuators integrated or affiliated with the sensors. The other vehicle commands can, for example, mitigate NVH to the seat 700 and steering wheel 600 of the vehicle 10. For example, a damping system can be activated, a driveline component can be adjusted, or an accessory or other vehicle system can be adjusted, among others. Only so much of the vehicle NVH can be ameliorated by the other vehicle commands. The engine 100 itself can be a contributor to the NVH, and so a CDA controller 1022 can implement cylinder selections on the valvetrain of the engine 100 to operate the vehicle 10 within NVH thresholds, as described in more detail hereinbelow. The CDA controller 1022 may include numerous hardware configurations, including sub processors, networked computing devices, among others. The operation mode of the vehicle 10 can be processed using the control algorithms and CDA modes can be selected, or all-cylinder firing modes can be selected, and various cylinder activation techniques can be implemented, as discussed in detail hereinbelow.

Figures 3A, 3B, 3C, 4A:
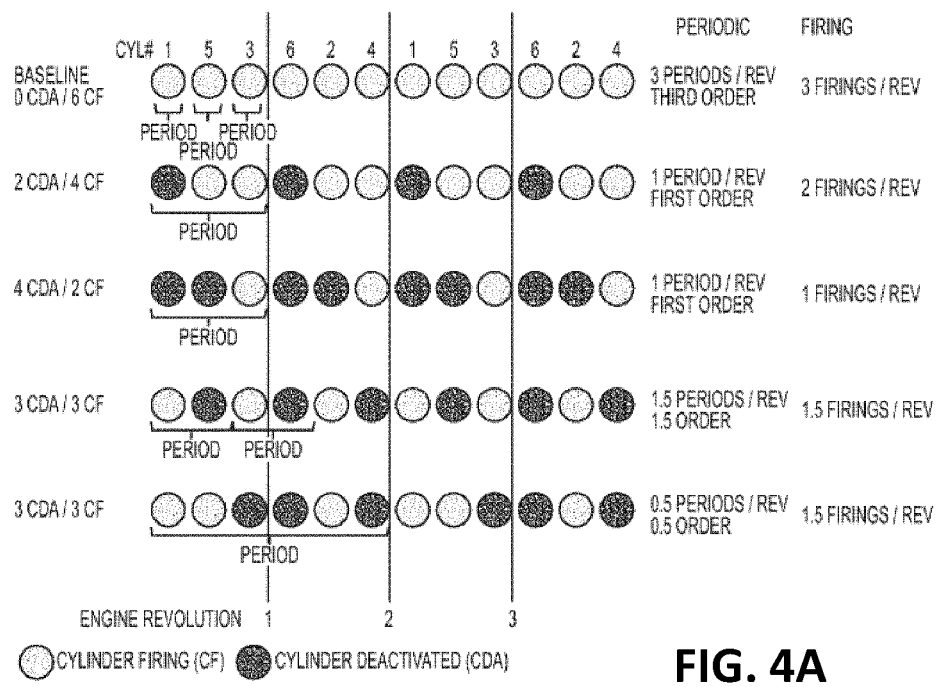
FIGS. 3A-3C are illustrations of CDA configurations in 6-cylinder in-line engines.
FIGS. 4A-4B are cylinder firing and cylinder deactivation combinations illustrative of periodic information in a 6 cylinder engine.

Combinations of variable valve actuation (VVA) hardware on a valvetrain can enable an engine to switch between operating modes. Capsules, latches, rocker arms, roller lifters, switching roller finger followers, cams, solenoids, oil control valves, among others can be used with the engine 100 to open and close intake and exhaust valves paired with cylinders 1-6. The cylinders can include a single intake valve or pairs of intake valves per cylinder, likewise, single exhaust valve or pairs of exhaust valves per cylinder 1-6. FIGS. 3A-3B illustrate example cylinder variations for cylinder deactivation modes and the VVA hardware can be configured to implement the fired "Valve Active" or deactivated "Valve Inactive" cylinder combinations. CDA modes can include engine operation where intake and exhaust valves are closed and fuel is shut off while a piston reciprocates in an engine cylinder. The CDA modes disclosed herein can include low pressure charge trapping, also known as residual exhaust gas CDA. High pressure charge trapping is not excluded, nor are techniques "topping off" cylinder pressures with fuel injections or cylinder "burps."

FIG. 3A illustrates different cylinder combinations that can occur when four cylinders are deactivated in a cylinder deactivation mode while two cylinders are fired in a cylinder firing (CF) mode, i.e., 4CDA or 2CF. FIG. 3B illustrates different cylinder combinations that can occur when three cylinders are deactivated while two cylinders are fired, i.e., 3CDA or 3CF. FIG. 3C illustrates cylinder combinations that can occur when two cylinders are deactivated in a cylinder deactivation mode while four cylinders are fired in a cylinder firing mode, i.e., 2CDA or 4CF.

There is an equivalence between cylinder deactivation modes, such that NVH in an in-line engine can switch between which cylinders are in firing mode and which cylinders are in CDA mode. As recognized, the NVH for having cylinders 1-3 active in cylinder firing mode and cylinders 4-6 deactivated in CDA mode is the same as having cylinders 4-6 in cylinder firing mode and cylinders 1-3 in CDA mode. Also, the NVH response has equivalence when cylinders are as indicated in FIG. 3A (cylinders 1 & 6, cylinders 3 & 4, and cylinders 2 & 5 in cylinder firing mode while the remainder are in CDA mode). Likewise, FIG. 3C has NVH equivalence among the 2CDA or 4CF modes illustrated. This provides a valuable diesel engine system.

It is contemplated that instead of costly VVA on each of the cylinders of the valvetrain, an option that is certainly beneficial and contemplated as an embodiment of this disclosure, a diesel engine system can comprise CDA hardware on less then all of the cylinders of the valvetrain. One or two or more cylinders can be provided with a basic set of hardware, or an engine braking set of hardware, for example, while other cylinders provide the CDA modes disclosed herein It is also contemplated that implementing multi-cylinder cylinder deactivation modes in a functioning 6-cylinder engine can include switching between equivalent two-cylinder CF modes (FIG. 3A), wherein cylinders 1 & 6 of the 6-cylinder engine are switched between cylinders 2 & 5 of the 6-cylinder engine or are switched between cylinders 3 & 4 of the 6-cylinder engine for the cylinder firing modes. The remaining cylinders (respectively 2-5; 1, 3, 4, & 6; and 1, 2, 5, & 6) can be correspondingly switched in CDA modes.

It is contemplated that implementing multi-cylinder cylinder deactivation modes in a functioning 6-cylinder engine can include switching between equivalent three-cylinder CF modes (FIG. 3B), wherein cylinders 1-3 of the 6-cylinder engine firing are switched between cylinders 4-6 of the 6-cylinder engine firing.

Further, it is contemplated that implementing multi-cylinder cylinder deactivation modes in a functioning 6-cylinder engine can include switching between equivalent four-CF modes (FIG. 3C), wherein cylinders 1, 3, 4, & 6 of the 6-cylinder engine can be switched in CF mode between cylinders 1, 2, 5, & 6 of the 6-cylinder engine firing. The remaining cylinders (respectively 2 & 5 and 3 & 4) can be correspondingly switched in CDA modes.

Figure 4B:
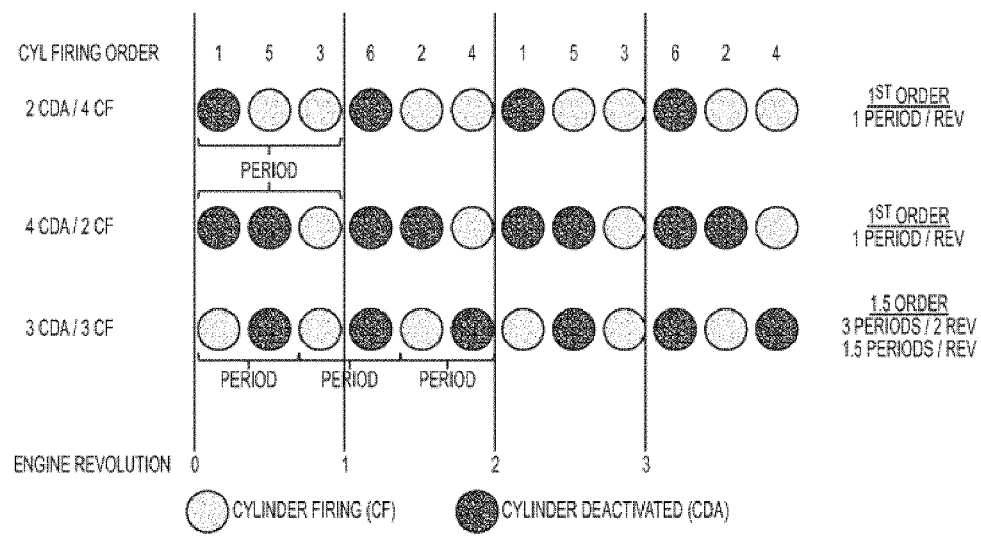

The CDA modes can be characterized by forcing functions, also known as periodic orders. The periodic orders are summarized for various combinations of cylinders deactivated and cylinders firing in FIGS. 4A and 4B, showing 6-cylinder engine combinations. The periodic orders and cylinder combinations are compared to baseline all-cylinders firing 6 CF mode. Firing periods are denoted for cylinders firing, and these firing periods are correlated to the engine revolutions to arrive at the periodic orders. The periodic orders can be correlated to the resonant frequencies to operate in and to avoid. The modal alignment map can be structured to permit the processor to select CDA modes with acceptable effective frequencies while avoiding resonant frequencies. These configurations are further illustrated in FIGS. 3A-3C, which show different arrangements of 2CF, 3 CF and 4 CF modes applied to a 6-cylinder inline engine.

Equations for calculating the correlations between the firing orders, the periodic orders, and the effective frequency of the CDA modes can be as in the following examples:
4 Cylinders Firing @ 1000 rpm Example 1

Number of Cylinders Fired Per Revolution (Firing Order) =2

$$f_{firing} = \frac{rpm}{60 \text{ s/min}} * \frac{\# \text{ Cyl fired}}{rev} = \frac{1000 \text{ rpm}}{60 \text{ s/min}} * 1 = 33.3 \text{ Hz}$$

Example 2

Number of Periods Per Revolution (Periodic Order)=1

$$f_{periodic} = \frac{rpm}{60 \text{ s/min}} * \frac{\# \text{ periods}}{rev} = \frac{1000 \text{ rpm}}{60 \text{ s/min}} * 1 = 16.7 \text{ Hz}$$

Example 3

Number of Cylinders Fired Per Revolution (Firing Order) =1

$$f_{firing} = \frac{rpm}{60 \text{ s/min}} * \frac{\# \text{ Cyl fired}}{rev} = \frac{1000 \text{ rpm}}{60 \text{ s/min}} * 1 = 16.7 \text{ Hz}$$

Example 4

Number of Periods Per Revolution (Periodic Order)=1

$$f_{periodic} = \frac{rpm}{60 \text{ s/min}} * \frac{\# \text{ periods}}{rev} = \frac{1000 \text{ rpm}}{60 \text{ s/min}} * 1 = 16.7 \text{ Hz}$$

In order to simplify the implementation of cylinder deactivation modes and address a market-adoption hurdle, the methods herein can comprise monitoring an engine load. Built into the method is a calibratable delineation of engine load.

The brake mean effective pressure ("BMEP") provides a standardization for the engine so that the methods herein can be scaled to other engine sizes. Thus, the disclosure is not limited to 3 bar BMEP. In some instances, the CDA mode limit can be reached at, for example, 2 bar BMEP or 4 bar BMEP, among others, including fractions thereof.

Previous methods focused on reducing the NVH experienced by an operator by focusing on linear vibration and tuning the engine mounts M1, M2, M3 to reduce the NVH experienced by the operator during operation of the various CDA modes. The inventors found that consideration should also be given to the NVH experienced by the driveline (i.e., the clutch 200, the transmission 300, the drive axles and driveshaft 400). If the NVH experienced by the driveline is not taken into consideration, undesired noise may be experienced. The inventors found that if the engine speed and gear selection is known, it is possible to select the proper CDA mode to avoid the driveline experiencing excessive NVH.

The present method is explained in detail below. The inventors found that, for each gear (Gi) (where i=1, 2, . . . n, where n=total number of gears), each of Order 1.5 and Order 1 has a critical engine speed ($S2_{ij}$, $S3_{ij}$) (where S2 is for the $2^{nd}$ mode, S3 is for $3^{rd}$ mode, i=1, 2, . . . n, where n=total number of gears and j=1, 1.5 for Order 1 and Order 1.5) at which the torsional vibration of the driveline will be at a natural harmonic frequency and cause excessive NVH. In other words, the critical speeds represent, for a given Order (1.5 or 1), the engine speeds to be avoided when the transmission 300 is in the given gear Gi. For Order 3, i.e., all cylinders firing, the driveline is designed to handle the natural harmonic frequencies generated at the critical engine speed so no action is required by the electronic control unit 1000 when the engine 100 is in Order 3.

Data was collected for torsional vibration of the driveline in the $2^{nd}$ mode and the $3^{rd}$ mode. The inventors found that torsional vibration in the $2^{nd}$ mode contributed more to NVH, as compared to torsional vibration in the $3^{rd}$ mode. Accordingly, consideration is given below to torsional vibration in the $2^{nd}$ mode although data is also provided for torsional vibration in the $3^{rd}$ mode.

Critical speed, gear selection and order data was collected for a 6-cylinder diesel engine connected to an Eaton Cummins Automated Transmission Technologies Model 1 (also referred as "ENDURANT") and Model 2 transmissions for land vehicles, and more specifically, for vehicles with a 6×2, 6×4, or 6×8 configuration. The data collected is provided in TABLES 1-4 and FIGS. 5A-8B. In FIGS. 5A-8B, the error bars represent the critical speeds +/−200 RPM.

TABLE 1

Figure 5A:
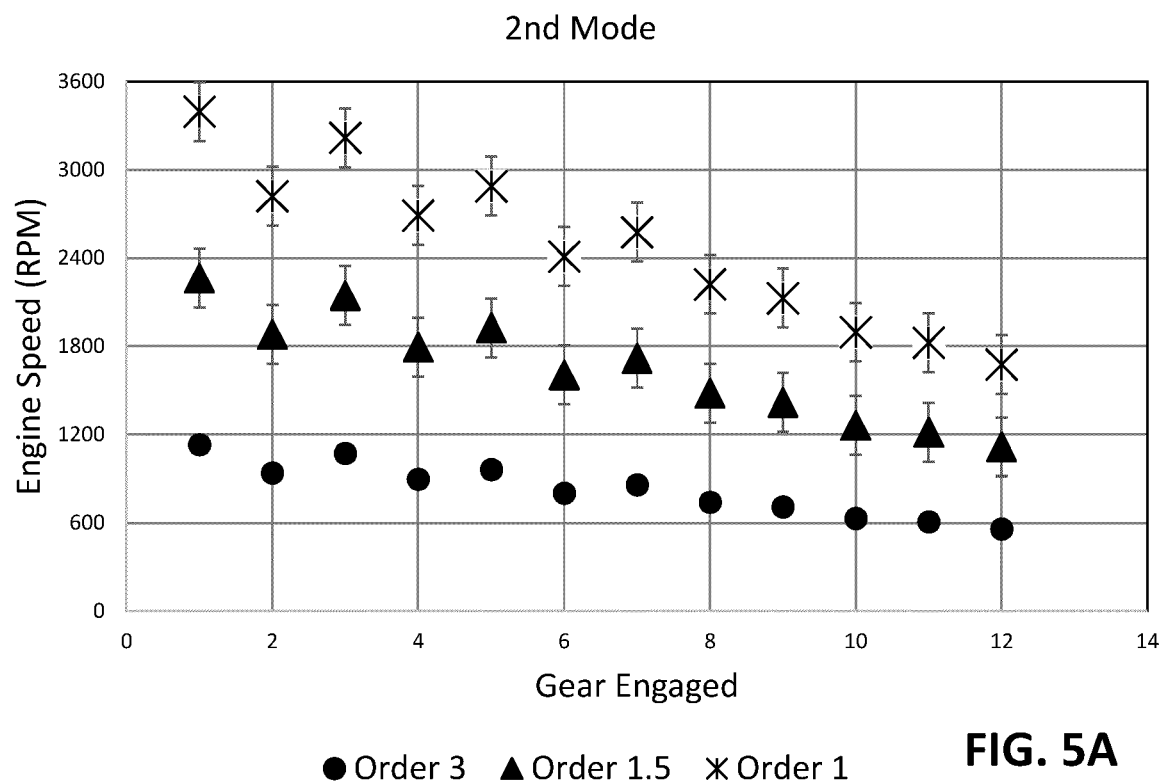
FIGS. 5A-8B are graphical illustrations of data collected from engine sweeps.
Figure 5B:
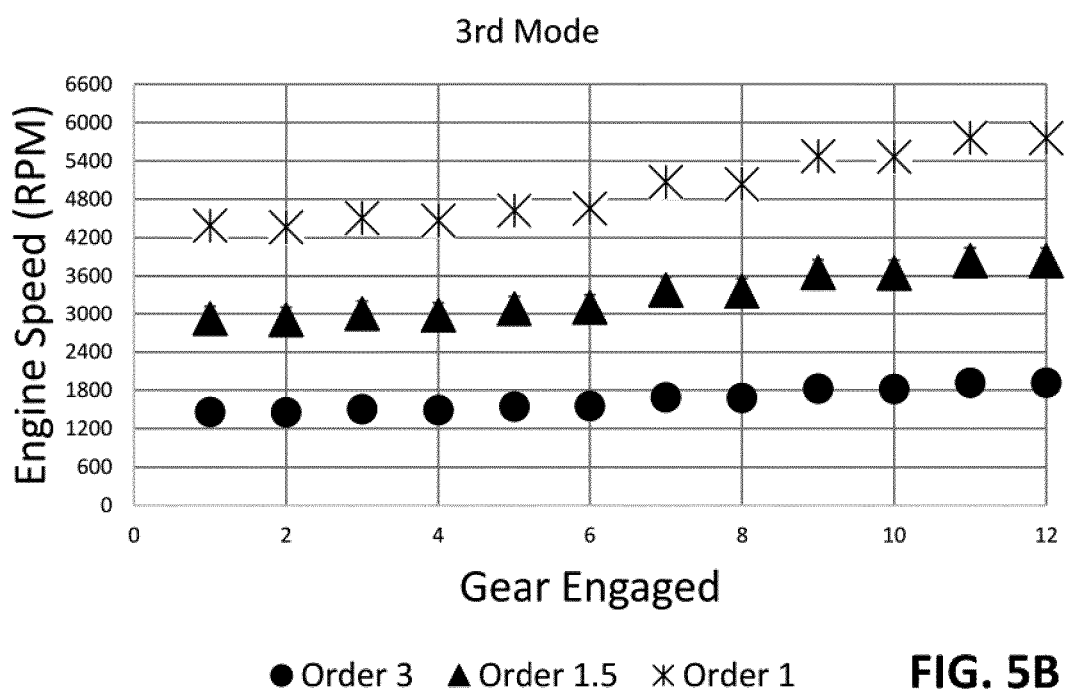

MODEL 1 6 × 2 (FIGS. 5A and 5B)

| Gear Engage ($G_i$) | Gear Ratio | $2^{nd}$ Mode | $3^{rd}$ Mode | $2^{nd}$ Mode Order 3 Engine Speed (RPM) ($S2_{i,3}$) | $2^{nd}$ Mode Order 1.5 Engine Speed (RPM) ($S2_{i,1.5}$) | $2^{nd}$ Mode Order 1 Engine Speed (RPM) ($S2_{i,1}$) | $3^{rd}$ Mode Order 3 Engine Speed (RPM) ($S3_{i,3}$) | $3^{rd}$ Mode Order 1.5 Engine Speed (RPM) ($S3_{i,1.5}$) | $3^{rd}$ Mode Order 1 Engine Speed (RPM) ($S3_{i,1}$) |
|---|---|---|---|---|---|---|---|---|---|
| 1 | 14.43 | 56.6 | 73.1 | 1132 | 2264 | 3395 | 1462 | 2925 | 4387 |
| 2 | 11.05 | 47.0 | 72.7 | 940 | 1881 | 2821 | 1454 | 2908 | 4362 |
| 3 | 8.44 | 53.6 | 75.1 | 1073 | 2145 | 3218 | 1502 | 3004 | 4506 |
| 4 | 6.46 | 44.8 | 74.5 | 897 | 1794 | 2690 | 1489 | 2979 | 4468 |
| 5 | 4.95 | 48.1 | 77.1 | 963 | 1926 | 2888 | 1541 | 3082 | 4623 |
| 6 | 3.79 | 40.2 | 77.6 | 803 | 1607 | 2410 | 1552 | 3104 | 4656 |
| 7 | 2.91 | 42.9 | 84.5 | 859 | 1718 | 2576 | 1689 | 3379 | 5068 |
| 8 | 2.23 | 37.0 | 83.9 | 741 | 1481 | 2222 | 1678 | 3356 | 5034 |
| 9 | 1.70 | 35.4 | 91.3 | 709 | 1418 | 2127 | 1825 | 3651 | 5476 |
| 10 | 1.30 | 31.6 | 91.1 | 632 | 1264 | 1896 | 1822 | 3645 | 5467 |
| 11 | 1.00 | 30.4 | 96.0 | 608 | 1216 | 1824 | 1920 | 3840 | 5760 |
| 12 | 0.77 | 27.9 | 96.0 | 559 | 1117 | 1676 | 1919 | 3838 | 5758 |

TABLE 2

Figure 6A:
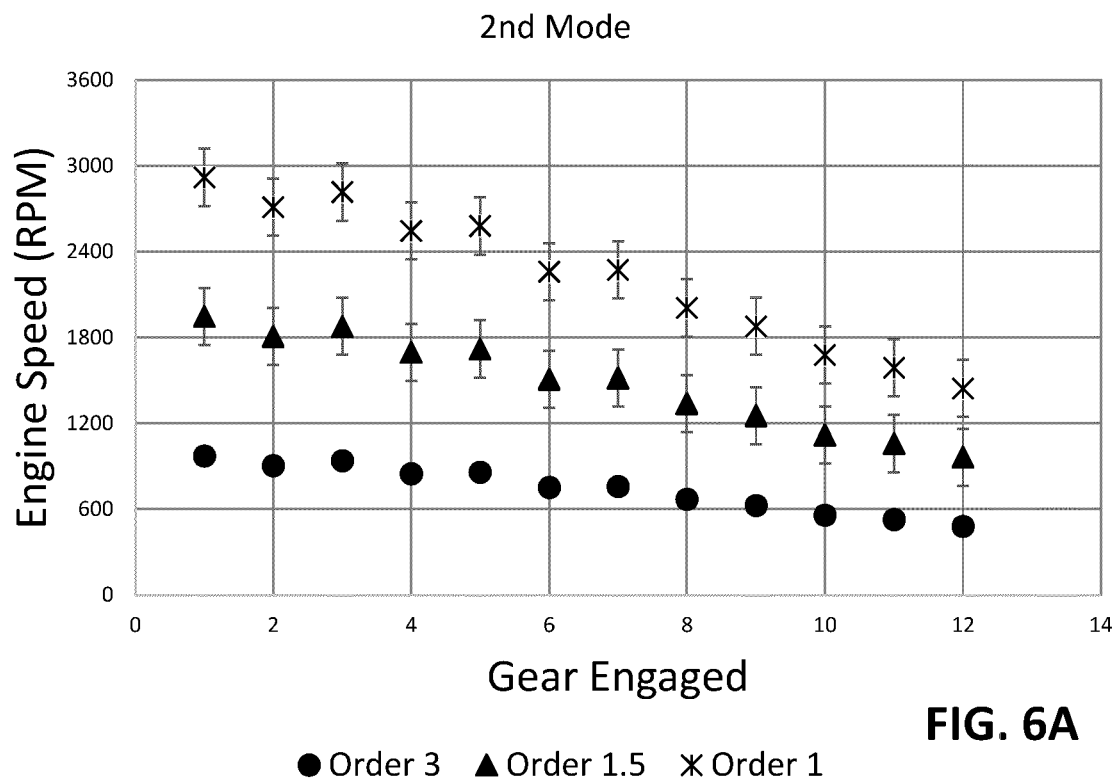
Figure 6B:
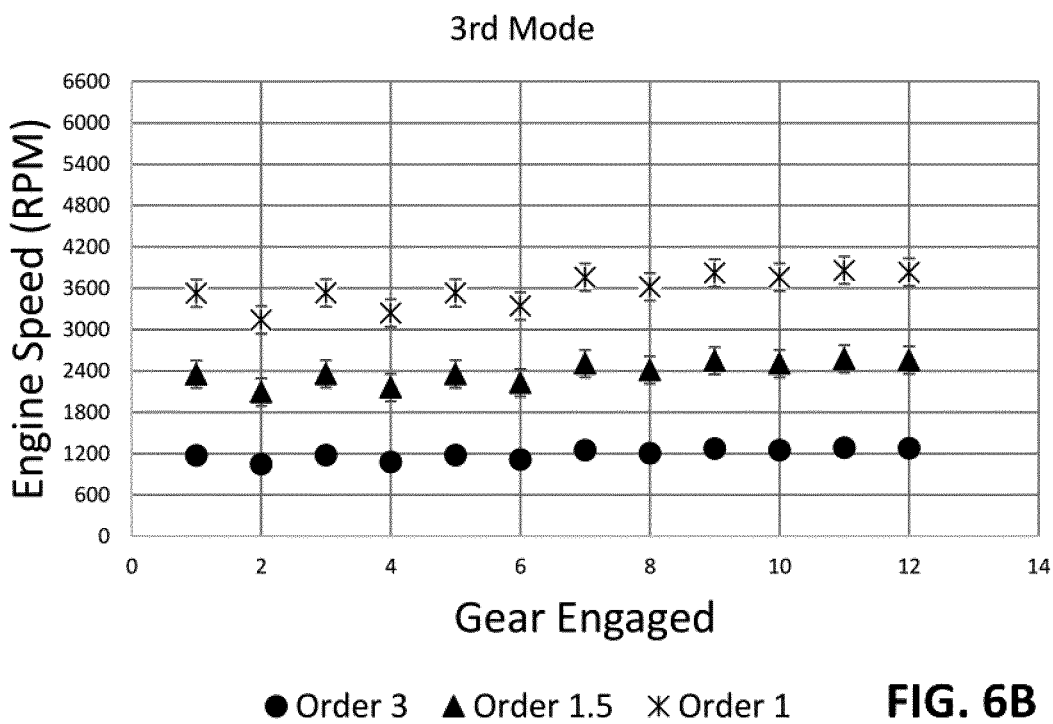

MODEL 1 6 × 4 (FIGS. 6A and 6B)

| Gear Engage ($G_i$) | Gear Ratio | $2^{nd}$ Mode | $3^{rd}$ Mode | $2^{nd}$ Mode Order 3 Engine Speed (RPM) ($S2_{i,3}$) | $2^{nd}$ Mode Order 1.5 Engine Speed (RPM) ($S2_{i,1.5}$) | $2^{nd}$ Mode Order 1 Engine Speed (RPM) ($S2_{i,1}$) | $3^{rd}$ Mode Order 3 Engine Speed (RPM) ($S3_{i,3}$) | $3^{rd}$ Mode Order 1.5 Engine Speed (RPM) ($S3_{i,1.5}$) | $3^{rd}$ Mode Order 1 Engine Speed (RPM) ($S3_{i,1}$) |
|---|---|---|---|---|---|---|---|---|---|
| 1 | 14.43 | 48.7 | 58.8 | 973 | 1946 | 2919 | 1175 | 2350 | 3526 |
| 2 | 11.05 | 45.2 | 52.3 | 904 | 1807 | 2711 | 1046 | 2092 | 3139 |
| 3 | 8.44 | 46.9 | 58.9 | 939 | 1878 | 2816 | 1178 | 2355 | 3533 |
| 4 | 6.46 | 42.4 | 54.0 | 849 | 1697 | 2546 | 1079 | 2158 | 3237 |
| 5 | 4.95 | 43.0 | 58.9 | 860 | 1720 | 2580 | 1177 | 2354 | 3531 |
| 6 | 3.79 | 37.7 | 55.7 | 753 | 1507 | 2260 | 1114 | 2228 | 3342 |
| 7 | 2.91 | 37.9 | 62.6 | 758 | 1516 | 2274 | 1253 | 2505 | 3758 |
| 8 | 2.23 | 33.4 | 60.3 | 669 | 1338 | 2007 | 1206 | 2412 | 3618 |
| 9 | 1.70 | 31.3 | 63.7 | 626 | 1252 | 1878 | 1274 | 2547 | 3821 |
| 10 | 1.30 | 28.0 | 62.6 | 559 | 1118 | 1678 | 1253 | 2506 | 3758 |
| 11 | 1.00 | 26.5 | 64.3 | 529 | 1059 | 1588 | 1287 | 2573 | 3860 |
| 12 | 0.77 | 24.1 | 63.9 | 481 | 963 | 1444 | 1278 | 2555 | 3833 |

TABLE 3

Figure 7A:
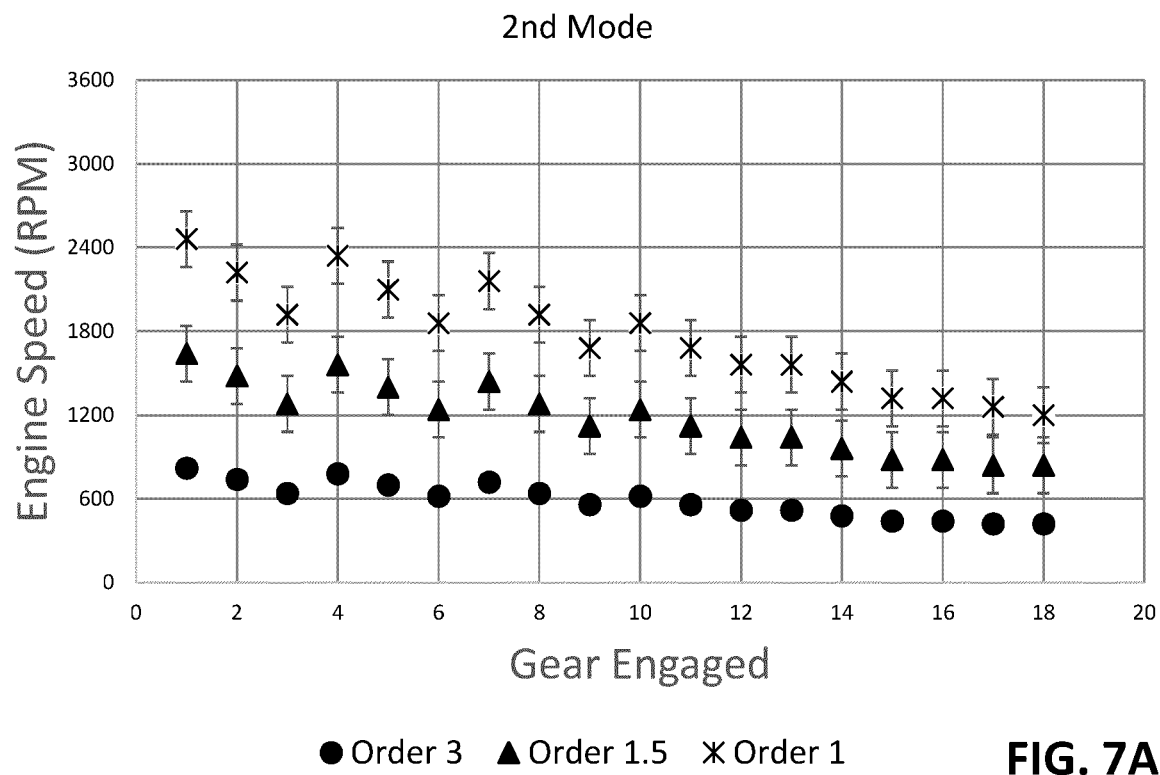
Figure 7B:
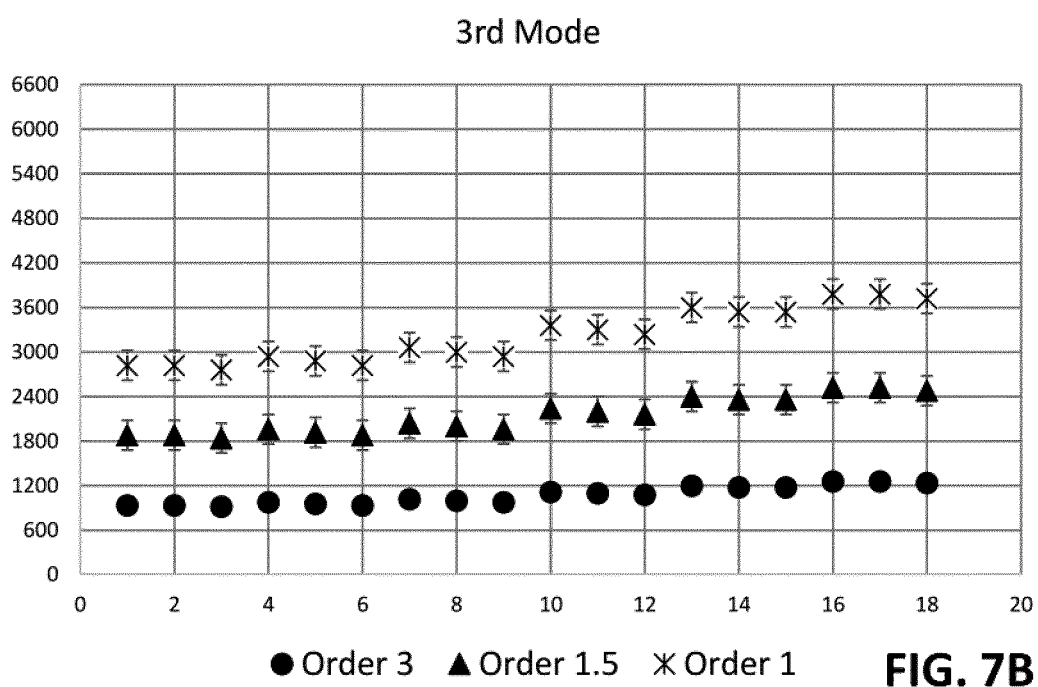

MODEL 2 6 × 4 (FIGS. 7A and 7B)

| Gear Engage ($G_i$) | Gear Ratio | $2^{nd}$ Mode | $3^{rd}$ Mode | $2^{nd}$ Mode | | | $3^{rd}$ Mode | | |
|---|---|---|---|---|---|---|---|---|---|
| | | | | Order 3 Engine Speed (RPM) ($S2_{i,3}$) | Order 1.5 Engine Speed (RPM) ($S2_{i,1.5}$) | Order 1 Engine Speed (RPM) ($S2_{i,1}$) | Order 3 Engine Speed (RPM) ($S3_{i,3}$) | Order 1.5 Engine Speed (RPM) ($S3_{i,1.5}$) | Order 1 Engine Speed (RPM) ($S3_{i,1}$) |
| 1 | 14.324 | 41 | 47 | 820 | 1640 | 2460 | 940 | 1880 | 2820 |
| 2 | 11.959 | 37 | 47 | 740 | 1480 | 2220 | 940 | 1880 | 2820 |
| 3 | 10.019 | 32 | 46 | 640 | 1280 | 1920 | 920 | 1840 | 2760 |
| 4 | 8.428 | 39 | 49 | 780 | 1560 | 2340 | 980 | 1960 | 2940 |
| 5 | 7.036 | 35 | 48 | 700 | 1400 | 2100 | 960 | 1920 | 2880 |
| 6 | 5.895 | 31 | 47 | 620 | 1240 | 1860 | 940 | 1880 | 2820 |
| 7 | 4.952 | 36 | 51 | 720 | 1440 | 2160 | 1020 | 2040 | 3060 |
| 8 | 4.135 | 32 | 50 | 640 | 1280 | 1920 | 1000 | 2000 | 3000 |
| 9 | 3.464 | 28 | 49 | 560 | 1120 | 1680 | 980 | 1960 | 2940 |
| 10 | 2.892 | 31 | 56 | 620 | 1240 | 1860 | 1120 | 2240 | 3360 |
| 11 | 2.415 | 28 | 55 | 560 | 1120 | 1680 | 1100 | 2200 | 3300 |
| 12 | 2.023 | 26 | 54 | 520 | 1040 | 1560 | 1080 | 2160 | 3240 |
| 13 | 1.702 | 26 | 60 | 520 | 1040 | 1560 | 1200 | 2400 | 3600 |
| 14 | 1.421 | 24 | 59 | 480 | 960 | 1440 | 1180 | 2360 | 3540 |
| 15 | 1.19 | 22 | 59 | 440 | 880 | 1320 | 1180 | 2360 | 3540 |
| 16 | 1 | 22 | 63 | 440 | 880 | 1320 | 1260 | 2520 | 3780 |
| 17 | 0.835 | 21 | 63 | 420 | 840 | 1260 | 1260 | 2520 | 3780 |
| 18 | 0.699 | 20 | 62 | 420 | 840 | 1200 | 1240 | 2480 | 3720 |

TABLE 4

Figure 8A:
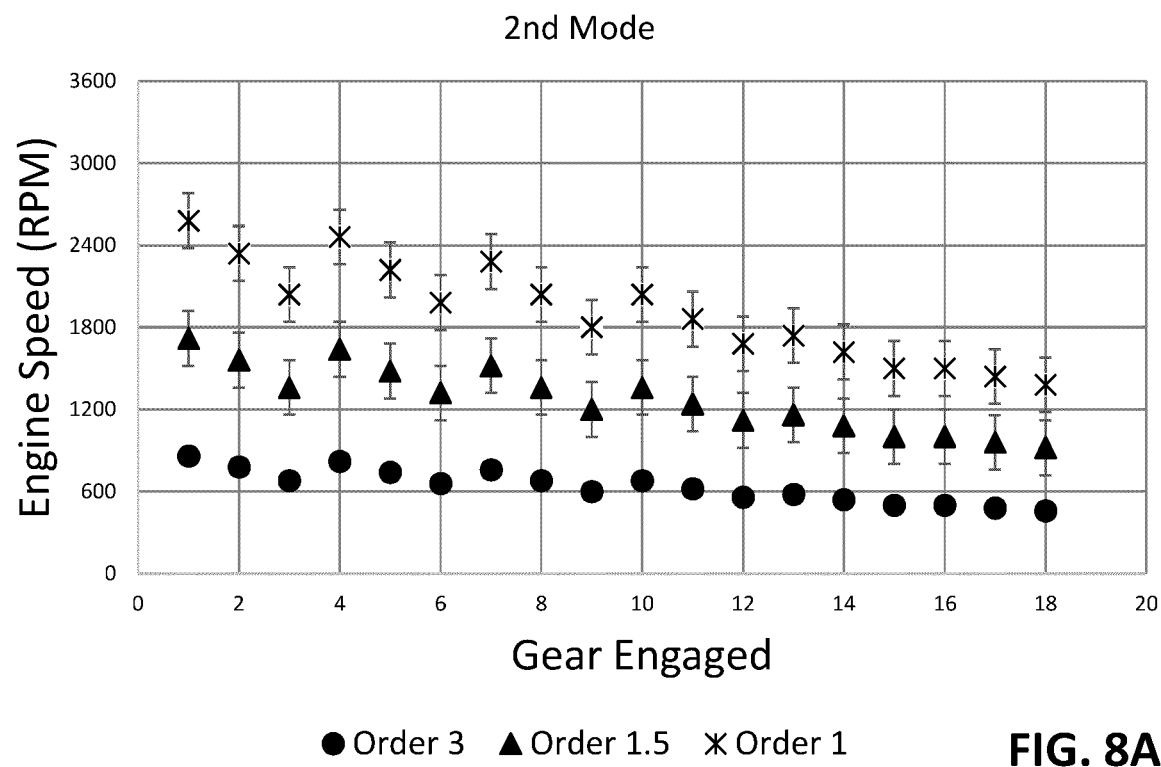
Figure 8B:
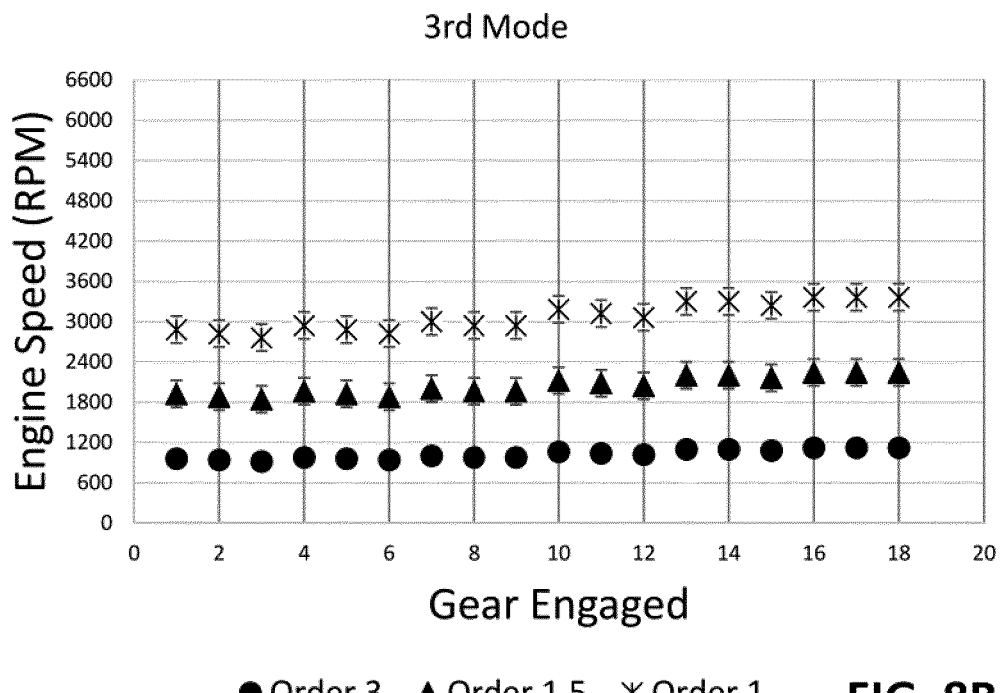

MODEL 2 8 × 6 (FIGS. 8A and 8B)

| Gear Engage ($G_i$) | Gear Ratio | $2^{nd}$ Mode | $3^{rd}$ Mode | $2^{nd}$ Mode | | | $3^{rd}$ Mode | | |
|---|---|---|---|---|---|---|---|---|---|
| | | | | Order 3 Engine Speed (RPM) ($S2_{i,3}$) | Order 1.5 Engine Speed (RPM) ($S2_{i,1.5}$) | Order 1 Engine Speed (RPM) ($S2_{i,1}$) | Order 3 Engine Speed (RPM) ($S3_{i,3}$) | Order 1.5 Engine Speed (RPM) ($S3_{i,1.5}$) | Order 1 Engine Speed (RPM) ($S3_{i,1}$) |
| 1 | 14.324 | 43 | 48 | 860 | 1720 | 2580 | 960 | 1920 | 2880 |
| 2 | 11.959 | 39 | 47 | 780 | 1560 | 2340 | 940 | 1880 | 2820 |
| 3 | 10.019 | 34 | 46 | 680 | 1360 | 2040 | 920 | 1840 | 2760 |
| 4 | 8.428 | 41 | 49 | 820 | 1640 | 2460 | 980 | 1960 | 2940 |
| 5 | 7.036 | 37 | 48 | 740 | 1480 | 2220 | 960 | 1920 | 2880 |
| 6 | 5.895 | 33 | 47 | 660 | 1320 | 1980 | 940 | 1880 | 2820 |
| 7 | 4.952 | 38 | 50 | 760 | 1520 | 2280 | 1000 | 2000 | 3000 |
| 8 | 4.135 | 34 | 49 | 680 | 1360 | 2040 | 980 | 1960 | 2940 |
| 9 | 3.464 | 30 | 49 | 600 | 1200 | 1800 | 980 | 1960 | 2940 |
| 10 | 2.892 | 34 | 53 | 680 | 1360 | 2040 | 1060 | 2120 | 3180 |
| 11 | 2.415 | 31 | 52 | 620 | 1240 | 1860 | 1040 | 2080 | 3120 |
| 12 | 2.023 | 28 | 51 | 560 | 1120 | 1680 | 1020 | 2040 | 3060 |
| 13 | 1.702 | 29 | 55 | 580 | 1160 | 1740 | 1100 | 2200 | 3300 |
| 14 | 1.421 | 27 | 55 | 540 | 1080 | 1620 | 1100 | 2200 | 3300 |
| 15 | 1.19 | 25 | 54 | 500 | 1000 | 1500 | 1080 | 2160 | 3240 |
| 16 | 1 | 25 | 56 | 500 | 1000 | 1500 | 1120 | 2240 | 3360 |
| 17 | 0.835 | 24 | 56 | 480 | 960 | 1440 | 1120 | 2240 | 3360 |
| 18 | 0.699 | 23 | 56 | 460 | 920 | 1380 | 1120 | 2240 | 3360 |

Figure 9:
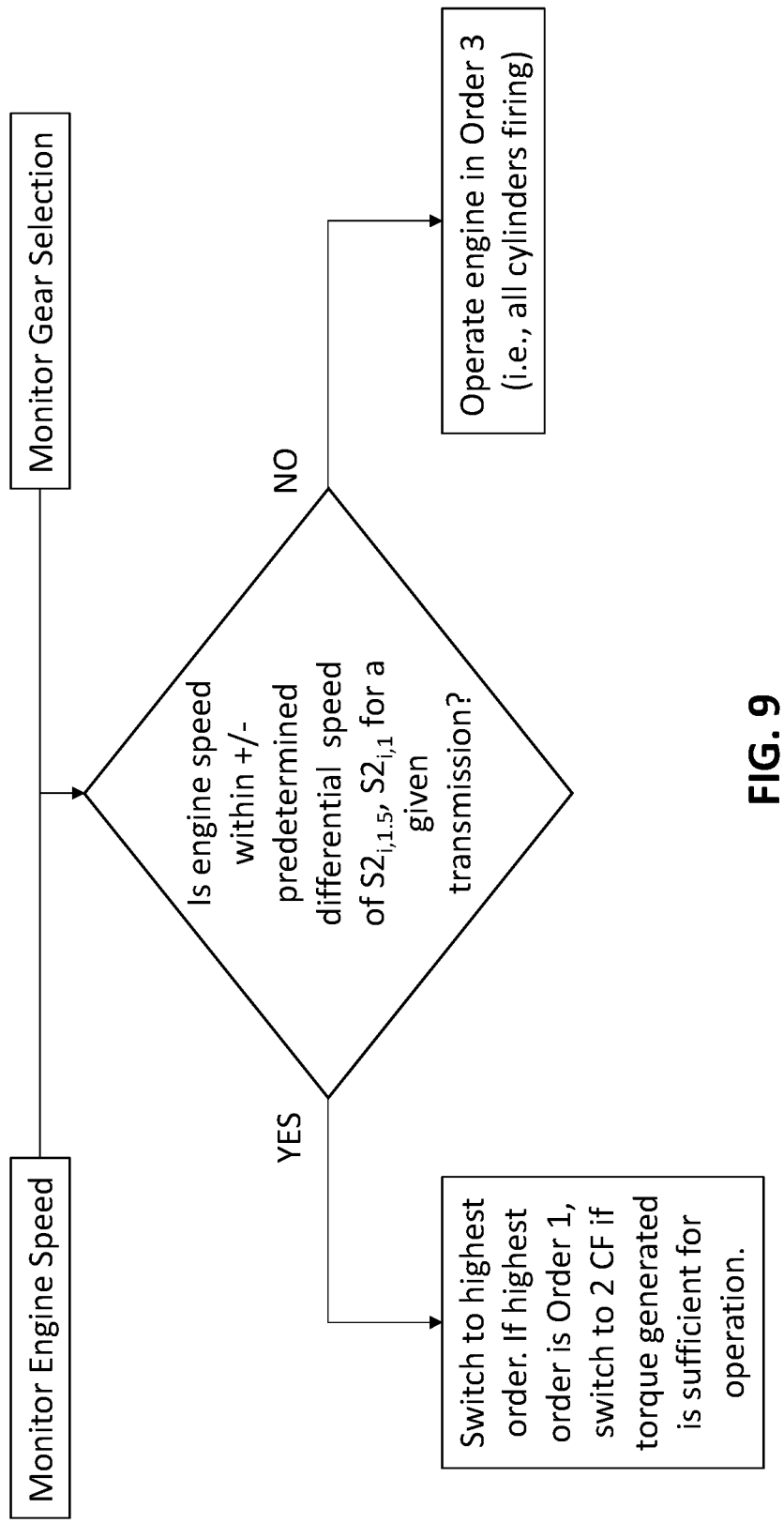
FIG. 9 is a flowchart of a CDA mode selection program.

Referring to FIG. 9, according to the present method, the engine speed and the gear selection for the transmission are monitored by the electronic control unit 1000. The electronic control unit 1000 is program such that, based on the engine speed in a given gear (Gi), the electronic control unit 1000 selects the highest CDA mode (Order 1.5 or Order 1) for which the present engine speed is more than a predetermined differential speed away from the critical speed ($S2_{ij}$). The predetermined differential speed is 150 RPM, preferably 200 RPM. When Order 1 is selected, preference is given to 2 cylinders firing over 4 cylinders firing, if 2 cylinders firing provides sufficient torque for the desired operation of the vehicle 10. If the engine speed is within plus or minus the predetermined differential speed of the critical speeds for Order 1.5 and 1, then the electronic control unit 1000 operates that engine 100 in Order 3, i.e., all cylinders firing.

As the transmission 300 shifts from one gear Gi to the next gear Gi, the electronic control unit 1000 continues to select the proper CDA mode of the engine 100 to avoid excessive NVH caused by torsional vibration in the driveline. It is also contemplated that as the speed of the engine 100 changes within a given gear (Gi), the electronic control unit 1000 is programmed to change from a first Order to a second Order in order to avoid operating the engine in the critical speed for the first Order.

Analysis of the data in TABLES 1-4 also shows that, by setting the predetermined differential speed to 200 RPM, the following Orders may be run:

1) Order 1.5 may be run in gears 1 through 5 when the engine speed is below 1160 RPM and Order 1 may be run in gears 1 through 5 when the engine speed is less than 1720 RPM;
2) Order 1 may be run in gears 1 through 9 when the engine speed is below 1480 RPM;
3) Order 1 may be run in gears 1 through 8 when the engine speed is below 1660 RPM;
4) Order 1.5 may be run in gears 1 through 7 when the engine speed is below 1040 RPM;
5) Order 1.5 may be run in gears 1-5 when the engine speed is below 1160 RPM; and
6) Order 1.5 may be run in gears 1 through 9 when the engine speed is below 920 RPM.

As described herein, the engine 100 operates on diesel fuel. It is contemplated that the present method may also be applicable to the engine 100 operating on other fuels, including but not limited to, natural gas, bio-diesel, hydrogen, gasoline or propane.

It will be apparent to those skilled in the art that various modifications and variations can be made without departing from the spirit and scope of the claimed invention.

What is claimed is:

1. A method of operating a 6-cylinder engine connected to a driveline, the method comprising:
   monitoring a rotational speed of a crankshaft of the 6-cylinder engine;
   monitoring a gear selection of a transmission of the driveline; and
   in response to the transmission being in one of gears 1 through 5 and the speed of the crankshaft being less than 1160 RPM, selectively operating the 6-cylinder engine by firing three cylinders and deactivating three cylinders; and
   in response to the transmission being in one of gears 1 through 5 and the speed of the crankshaft being less than 1720 RPM, selectively operating the 6-cylinder engine by firing two or four cylinders.

2. A non-transitory computer-readable storage medium storing a computer program comprising instructions that, when the program is executed by a computer or a controller, cause the computer to implement the method of claim 1.

3. A method for operating a 6-cylinder engine connected to a driveline, the method comprising:
   monitoring a rotational speed of a crankshaft of the 6-cylinder engine;
   monitoring a gear selection of a transmission of the driveline; and
   selectively operating the 6-cylinder engine in one of Order 3, Order 1.5 or Order 1 based on the following criteria in the following order:
      first, operating the 6-cylinder engine in Order 1.5 in response to the rotational speed of the crankshaft not being within a predetermined differential speed of a first critical speed of the crankshaft for the engine, wherein the first critical speed is associated with the gear selected and Order 1.5 and causes the driveline to vibrate at a natural harmonic frequency of the driveline, wherein Order 1.5 is firing three cylinders and deactivating three cylinders,
      second, operating the 6-cylinder engine in Order 1 in response to the rotational speed of the crankshaft not being within a predetermined differential speed of a second critical speed of the crankshaft for the engine, wherein the second critical speed is associated with the gear selected and Order 1 and causes the driveline to vibrate at a natural harmonic frequency of the driveline, wherein Order 1 is firing two or four cylinders,
      else, operating the 6-cylinder engine in Order 3, wherein Order 3 is firing six cylinders.

4. A non-transitory computer-readable storage medium storing a computer program comprising instructions that, when the program is executed by a computer or a controller, cause the computer to implement the method of claim 3.

5. The method of claim 3, wherein operating in Order 1 prioritizes firing 2 cylinders over firing 4 cylinders.

6. The method of claim 3, wherein the predetermined differential speed is 200 revolutions per minute.

7. The method of claim 3, wherein the predetermined differential speed is 150 revolutions per minute.

8. The method of claim 3, wherein the transmission has 12 gears.

9. The method of claim 3, wherein the transmission has 18 gears.

10. The method of claim 3, wherein the transmission is provided on a vehicle with a 6×2 or a 6×4 configuration.

11. The method of claim 3, wherein the transmission is provided on a vehicle with a 8×6 configuration.

12. The method of claim 3, wherein the natural harmonic frequency of the driveline corresponds to a torsional vibration of the driveline.

13. A method for operating a 6-cylinder engine connected to a driveline including a transmission, the method comprising:
   monitoring a rotational speed of a crankshaft of the 6-cylinder engine;
   monitoring a gear selection of the transmission; and
   operating the 6-cylinder engine in one of Order 3, Order 1.5 or Order 1 based on whether the selected Order avoids operating the 6-cylinder engine at a critical speed that corresponds to a natural harmonic frequency of the driveline, wherein priority is given to operating in Order 1.5, Order 1 then Order 3, in that order, wherein Order 3 is firing six cylinders, Order 1.5 is firing three cylinders, and Order 1 is firing two or four cylinders, and wherein the critical speed is associated with the gear selected and the operating Order.

14. A non-transitory computer-readable storage medium storing a computer program comprising instructions that, when the program is executed by a computer or a controller, cause the computer to implement the method of claim 13.

15. The method of claim 13, wherein operating in Order 1 prioritizes firing 2 cylinders over firing 4 cylinders.

16. The method of claim 13, wherein the transmission has 12 gears.

17. The method of claim 13, wherein the transmission has 18 gears.

18. The method of claim 13, wherein the transmission is provided on a vehicle with a 6×2 or a 6×4 configuration.

19. The method of claim 13, wherein the transmission is provided on a vehicle with a 8×6 configuration.

20. The method of claim 13, wherein the natural harmonic frequency of the driveline corresponds to a torsional vibration of the driveline.

* * * * *